US012742451B2

(12) United States Patent
Zhang et al.

(10) Patent No.: US 12,742,451 B2
(45) Date of Patent: Sep. 22, 2026

(54) CONNECTOR STRUCTURE OF STEPLESS CAPACITY CONTROL ACTUATOR OF RECIPROCATING COMPRESSOR

(71) Applicant: Beijing University of Chemical Technology, Chaoyang District (CN)

(72) Inventors: Jinjie Zhang, Chaoyang District (CN); Yao Wang, Chaoyang District (CN); Chao Zhou, Chaoyang District (CN)

(73) Assignee: BEIJING UNIVERSITY OF CHEMICAL TECHNOLOGY, Chaoyang District (CN)

( * ) Notice: Subject to any disclaimer, the term of this patent is extended or adjusted under 35 U.S.C. 154(b) by 13 days.

(21) Appl. No.: 19/049,376

(22) Filed: Feb. 10, 2025

(65) Prior Publication Data

US 2026/0126038 A1 May 7, 2026

(30) Foreign Application Priority Data

Nov. 7, 2024 (CN) ........................ 202411577866.9

(51) Int. Cl.

*F04B 49/16* (2006.01)
*F04B 49/22* (2006.01)
*F04B 49/24* (2006.01)
*F16K 41/02* (2006.01)
*F16K 41/04* (2006.01)
*F16K 41/08* (2006.01)

(52) U.S. Cl.

CPC ............ *F04B 49/16* (2013.01); *F04B 49/225* (2013.01); *F04B 49/243* (2013.01); *F16K 41/02* (2013.01); *F16K 41/04* (2013.01); *F16K 41/08* (2013.01)

(58) Field of Classification Search

CPC ...... F04B 49/16; F04B 49/243; F04B 49/225; F16K 41/02; F16K 41/04; F16K 41/08

See application file for complete search history.

(56) References Cited

U.S. PATENT DOCUMENTS 1,795,310 A * 3/1931 Mathews .............. F04B 49/243 92/135
2,065,204 A * 12/1936 Aikman ................ F04B 49/243 417/281

(Continued)

FOREIGN PATENT DOCUMENTS

CN 115628294 A * 1/2023 ............... F16K 1/46
EP 0308390 A1 * 3/1989 ............. F16K 41/02

(Continued)

*Primary Examiner* — Christopher S Bobish
(74) *Attorney, Agent, or Firm* — Tutunjian & Bitetto, P.C.

(57) ABSTRACT

Provided is a connector structure of a stepless capacity control actuator of a reciprocating compressor including an ejector rod configured to transfer power provided by a driving structure to an unloader. The connector structure includes a housing sleeving the ejector rod, a connecting member including a flange part and a sleeve part, and a sealing assembly including a first end face sealing ring, a second end face sealing ring, a first seal ring and an oil leakage joint. A first side of the flange part is connected with a second end of the housing and a second side of the flange part is configured to connect with the driving structure. A second oil hole is formed in the sleeve part and in butt joint with a first oil hole. The oil leakage joint is connected to the first oil hole.

10 Claims, 4 Drawing Sheets

(56) References Cited

U.S. PATENT DOCUMENTS 2,275,303 A * 3/1942 Mantle .................. F04B 49/243
417/298
3,188,049 A * 6/1965 Zawacki ................. F16K 41/02
251/327
3,307,574 A * 3/1967 Anderson ............. F16K 31/122
277/516
3,648,718 A * 3/1972 Curran .................... F16K 27/02
251/210
3,873,239 A * 3/1975 Jamieson ................ F04C 28/24
417/295
3,958,592 A * 5/1976 Wells ...................... F16K 41/02
137/246.22
4,394,872 A * 7/1983 Schobl .................... F16K 41/02
251/330
4,396,345 A * 8/1983 Hutchinson ............. F04C 28/24
415/28
5,230,498 A * 7/1993 Wood ..................... F16J 15/186
137/553
5,524,902 A * 6/1996 Cornette ................. F16K 41/02
277/529
5,525,047 A * 6/1996 Sternenberg ........ F16K 31/1221
251/282
5,540,558 A * 7/1996 Harden ................... F04C 28/24
417/295
5,908,046 A * 6/1999 Mosman ................. F16K 41/02
277/408
6,302,374 B1 * 10/2001 Fink ........................ F16K 41/02
251/368
11,841,718 B1 * 12/2023 Poolathody ........... F04C 29/124
2004/0007824 A1 * 1/2004 Durham .................. F04B 39/08
277/456
2006/0175567 A1 * 8/2006 Chan ....................... F16K 41/02
251/214
2008/0237518 A1 * 10/2008 Furuta ................... F04B 49/243
251/129.15
2011/0006242 A1 * 1/2011 Hutchens ................ F16K 41/02
251/366

FOREIGN PATENT DOCUMENTS

FR 2510711 A1 * 2/1938 ............. F16J 15/183
FR 2763375 A1 * 11/1998 ............. F16K 41/02
GB 2231125 A * 11/1990 ............. F16J 15/441
KR 20170117102 A * 10/2017 ......... F16K 31/0679
WO WO-7900386 A1 * 6/1979 .............. F04B 39/12
WO WO-03052308 A1 * 6/2003 ........... F16K 31/122
WO WO-2017201547 A1 * 11/2017 ............. F16K 41/02

* cited by examiner

CONNECTOR STRUCTURE OF STEPLESS CAPACITY CONTROL ACTUATOR OF RECIPROCATING COMPRESSOR

CROSS-REFERENCE TO RELATED APPLICATION

This patent application claims the benefit and priority of Chinese Patent Application No. 202411577866.9 filed with the China National Intellectual Property Administration on Nov. 7, 2024, the disclosure of which is incorporated by reference herein in its entirety as part of the present application.

TECHNICAL FIELD

The present disclosure relates to the technical field of reciprocating compressors, and in particular to a connector structure of a stepless capacity control actuator of a reciprocating compressor.

BACKGROUND

As the key power equipment in process industries such as oil refining, chemical industry and chemical fertilizer, the reciprocating compressor system is configured to delivery high pressure raw gas media to production process, which is the key of industrial production material flow, thus its safe, stable and reliable operation is the long-term demand of enterprises.

The reciprocating compressor changes the volume of a working chamber between the piston and the cylinder through the periodic movement of the piston, thus controlling the gas pressure in the working chamber. However, when the initial design of the process flow does not match the market demand, the capacity of the unit needs to be dynamically controlled to meet the production requirements. At present, the control mode that satisfies both energy conservation and the supply and demand of production gas is pressing-off inlet valve control, in which an electro-hydraulic servo actuator or electromagnetic actuator is installed on the inlet valve to control the flow and pressure of the unit quickly and accurately. Compared with other control methods, the pressing-off inlet valve control has the advantages of low project implementation difficulty, wide load adjustment range, and the most outstanding energy-saving effect.

The control system for the pressing-off inlet valve has been publicized in China and at abroad, in which the actuator is driven by hydraulic pressure or electromagnetic force. According to the different driving modes, there are generally two types of existing actuators, but the universal structural design is not considered. If different actuators are installed in the same type of unit, it is difficult to achieve component exchange, which brings great difficulties to on-site installation, maintenance and spare parts management.

SUMMARY

The present disclosure aims to provide a connector structure of a stepless capacity control actuator of a reciprocating compressor to solve the problems in the prior art, adapting to two driving modes of hydraulic pressure and electromagnetic force.

To achieve the objective above, the present disclosure employs the following technical solution.

The present disclosure provides a connector structure of a stepless capacity control actuator of a reciprocating compressor, including an ejector rod, where a first end of the ejector rod is configured to connect with a ejector plate of an unloader, and a second end of the ejector rod is configured to connect with a driving end of a driving structure.

A housing sleeving the ejector rod, where a gap is formed between the housing and the ejector rod, a first oil hole is formed in the housing, two ends of the first oil hole are located on an inner side surface and an outer side surface of the housing, respectively, and a first end of the housing is configured to connect with a valve cover of a compressor.

A connecting member including a flange part and a sleeve part, where a first side of the flange part is configured to connect with a second end of the housing, and a second side of the flange part is configured to connect with a shell of the driving structure and be in sealing contact with the shell. The sleeve part is connected to one side, away from the driving structure, of the flange part, the sleeve part is located between the ejector rod and the housing, and a gap is formed between the sleeve part and the ejector rod; a second oil hole is formed in the sleeve part, two ends of the second oil hole are located on an inner side surface and an outer side surface of the sleeve part, respectively; and the second oil hole is in butt joint with the first oil hole.

A sealing assembly including a first end face sealing ring, a second end face sealing ring, a first seal ring and an oil leakage joint, where the first end face sealing ring is configured to seal a gap between the first side of the flange part and the housing, and the second end face sealing ring is configured to seal a gap between the valve cover and the housing. The first seal ring is located between the ejector rod and the housing, and located on one side, away from the driving structure, of the sleeve part; an inner side surface of the first seal ring is in sealing contact with the ejector rod, and an outer side surface of the first seal ring is in sealing contact with the inner side surface of the housing to seal the gap between the ejector rod and the housing; and the oil leakage joint is in communication with the first oil hole for recovering hydraulic oil in a case that the driving structure is a hydraulic cylinder.

Preferably, the sealing assembly further includes a gas guide ring and a gas leakage joint; the gas guide ring is located between the ejector rod and the housing, and located at one side, away from the driving structure, of the first seal ring. A first gas hole is formed in the gas guide ring, and two ends of the first gas hole are located on an inner side surface and an outer side surface of the gas guide ring, respectively. A second gas hole is formed in the housing, two ends of the second gas hole are located on the inner side surface and the outer side surface of the housing, respectively. The second gas hole is in butt joint with the first gas hole; and the gas leakage joint is in communication with the second gas hole for recovering gas leaked from the compressor.

Preferably, the sealing assembly further includes a second seal ring located between the ejector rod and the housing, and located at one side, away from the driving structure, of the gas guide ring. An inner side surface of the second seal ring is in sealing contact with the ejector rod, and an outer side surface of the sealing ring is in sealing contact with the inner side surface of the housing, such that the gap between the ejector rod and the housing is sealed to reduce an volume of gas leaked from the compressor to the gas guide ring.

Preferably, the housing is provided with an inner flange, the inner flange is located at one side, away from the driving structure, of the second seal ring for limiting a circumferential position of the second seal ring, and the ejector rod extends through the inner flange.

Preferably, the second seal ring includes a second ring block, an inner sealing ring of the second ring block, and an outer sealing ring of the second ring block. The second ring block is located between the ejector rod and the housing, the inner sealing ring of the second ring block is embedded in an inner side surface of the second ring block for making sealing contact with the ejector rod, and the outer sealing ring of the second ring block is embedded in an outer side surface of the second ring block for making sealing contact with the inner side surface of the housing.

Preferably, an inner ring groove is formed in the inner side surface of the gas guide ring, an outer ring groove is formed in the outer side surface of the gas guide ring, one end of the first gas hole is in communication with the inner ring groove, and an other end of the first gas hole is in communication with the outer ring groove.

Preferably, the first seal ring includes a first ring block, an inner sealing ring of the first ring block, and an outer sealing ring of the first ring block. The first ring block is located between the ejector rod and the housing, the inner sealing ring of the first ring block is embedded in an inner side surface of the first ring block for making sealing contact with the ejector rod, and the outer sealing ring of the first ring block is embedded in an outer side surface of the first ring block for making sealing contact with the inner side surface of the housing.

Preferably, the second oil hole is obliquely arranged with respect to the sleeve part; and one end, located on the inner side surface of the sleeve part, of the second oil hole is closer to the driving structure than one end, located on the outer side surface of the sleeve part, of the second oil hole.

Preferably, following requirements need to be met during model selection of a return spring of the unloader:

$$k = m\frac{\arccos\left(\dfrac{F_{s1} - F' + F_{g1} + F_{g2} + f - mg\cos\alpha}{F_{s2} - F' + F_{g1} + F_{g2} + f - mg\cos\alpha}\right)}{t'_{max}}$$

$$k > \frac{F' + mg\cos\alpha - f - F_{g1}}{x_1}$$

following requirements need to be met during model selection of the driving structure:

$$F = \frac{k\left(x_1 + L - x_1\cdot\cos\left(\sqrt{\dfrac{k}{m}}\cdot t_{mx}\right)\right)}{1-\cos\left(\sqrt{\dfrac{k}{m}}\cdot t_{mx}\right)} + F_{g1} + f - mg\cos\alpha$$

where, $p_{cy}$ is a gas pressure in the compressor, $p_0$ is a standard atmospheric pressure, $p_s$ is a gas pressure in a suction chamber of the compressor, $\beta$ is a coefficient of a pressure difference between both sides of a valve plate of the unloader, $A_{sv}$ is an area of the valve plate, $A_1$ is a sectional area of the ejector rod, $$A_l = \frac{\pi}{4}d_1^2,$$

$d_1$ is a diameter of a section, close to the driving structure, of the ejector rod, and a diameter $d_2$ of a section, away from the driving structure, of the ejector rod is equal to $1.5d_1$, f is a friction force subjected by the ejector rod, g is gravity acceleration, L is a stroke of the unloader, $\alpha$ is a mounting angle of the unloader, which indicates an included angle between a central line of the unloader and a line perpendicular to a ground, m is a sum of masses of the ejector rod, the shell of the unloader, the ejector plate of the unloader, a ejector fork of the unloader and a gland of the unloader, $x_1$ is a pre-compression amount of the return spring, $F_{g2}$ is a gas force subjected by the valve plate, $F_{g2}=\beta(p_{cy}-p_s)A_{sv}$, k is stiffness of the return spring, x is a compression amount of the return spring, F' is a driving force of the driving structure on the ejector rod in a retraction process of the ejector rod, and F is a driving force of the driving structure on the ejector rod in an ejection process of the ejector rod;

Preferably, during the model selection of the ejector rod, the diameter of the ejector rod is determined through following iterative computation modes:

initially, $d_1$=10 mm is substituted into formula $$F = \frac{k\left(x_1 + L - x_1\cdot\cos\left(\sqrt{\dfrac{k}{m}}\cdot t_{max}\right)\right)}{1-\cos\left(\sqrt{\dfrac{k}{m}}\cdot t_{max}\right)} + F_{g1} + f - mg\cos\alpha$$

to calculate an ejection driving force;

if F≤800 N, then $d_1$=10 mm, and the diameter of the ejector rod is determined;

if F>800 N, then the diameter $d_1$ of the ejector rod needs to be increased to 12 mm;

$d_1$=12 mm is substituted into formula (11) for iterative computation to calculate an ejection driving force F;

if 800 N≤F≤1600 N, then $d_1$=12 mm, and the diameter of the ejector rod is determined; and if F>1600 N, then the diameter $d_1$ of the ejector rod needs to be increased to 14 mm, so that strength of the ejector rod is sufficient for use, the iterative computation is ended, and the diameter of the ejector rod is determined.

Compared with the prior art, the present disclosure has the following technical effects:

The connecting member includes the flange part configured to connect an outer side of the driving structure and the driving structure here may be a hydraulic cylinder, or an electromagnetic driving structure, such that the connector can adapt to two driving modes of the hydraulic pressure and the electromagnetic force, improving the whole universality.

In a preferred embodiment of the present disclosure, a second side of the flange part is in sealing contact with the shell of the driving structure, the first end face sealing ring seals a gap between the first side of the flange part and the housing, thus guiding the leaked hydraulic oil to the second oil hole along the gap between the sleeve part and the ejector rod, so that the hydraulic oil reaches an oil leakage joint through the second oil hole and the first oil hole, realizing the recovery of the hydraulic oil, and thus keeping clean and reducing the waste of the hydraulic oil.

In the preferred embodiment of the present disclosure, the sealing assembly further includes a gas guide ring and a gas leakage joint. As the second end face sealing ring seals the gap between the valve cover and the housing, a gas leaked from the suction chamber flows to the gas guide ring along the ejector rod, passes through the first gas hole and the second gas hole to reach the gas leakage joint, thus achieving the recovery of the leaked gas.

In the preferred embodiment of the present disclosure, the sealing assembly further includes a second seal ring. The second seal ring is located between the ejector rod and the housing, and located at one side, away from the driving structure, of the gas guide ring. An inner side surface of the second seal ring is in sealing contact with the ejector rod, and an outer side surface of the second seal ring is in sealing contact with the inner side surface of the housing, thus sealing the gap between the ejector rod and the housing to reducing the volume of gas leaked from the compressor to the gas guide ring. The second seal ring can improve the sealing performance, such that the leaked gas needs greater gas pressure to reach the gas guide ring, thus the gas flow can be blocked to a certain extent to reduce the leakage of the gas.

In the preferred embodiment of the present disclosure, the specific computation method related to the model selection of the return spring and the ejector rod is provided, which is convenient for a worker to quickly and accurately select the appropriate parts to use, such that the working efficiency is improved, and the safe operation of products is ensured.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
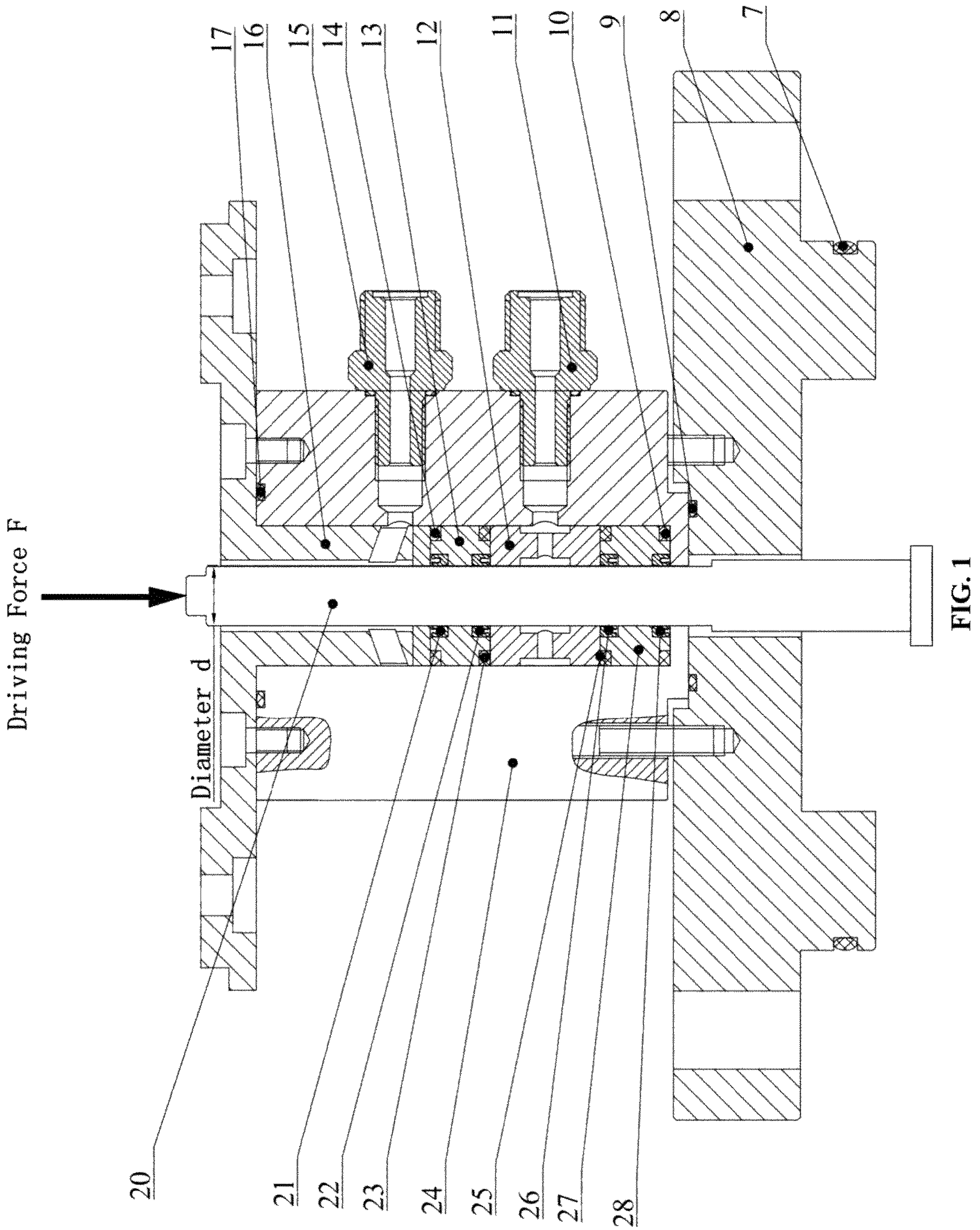
FIG. 1 is a schematic diagram of a connector structure of a stepless capacity control actuator of a reciprocating compressor according to an embodiment of the present disclosure.
Figure 2:
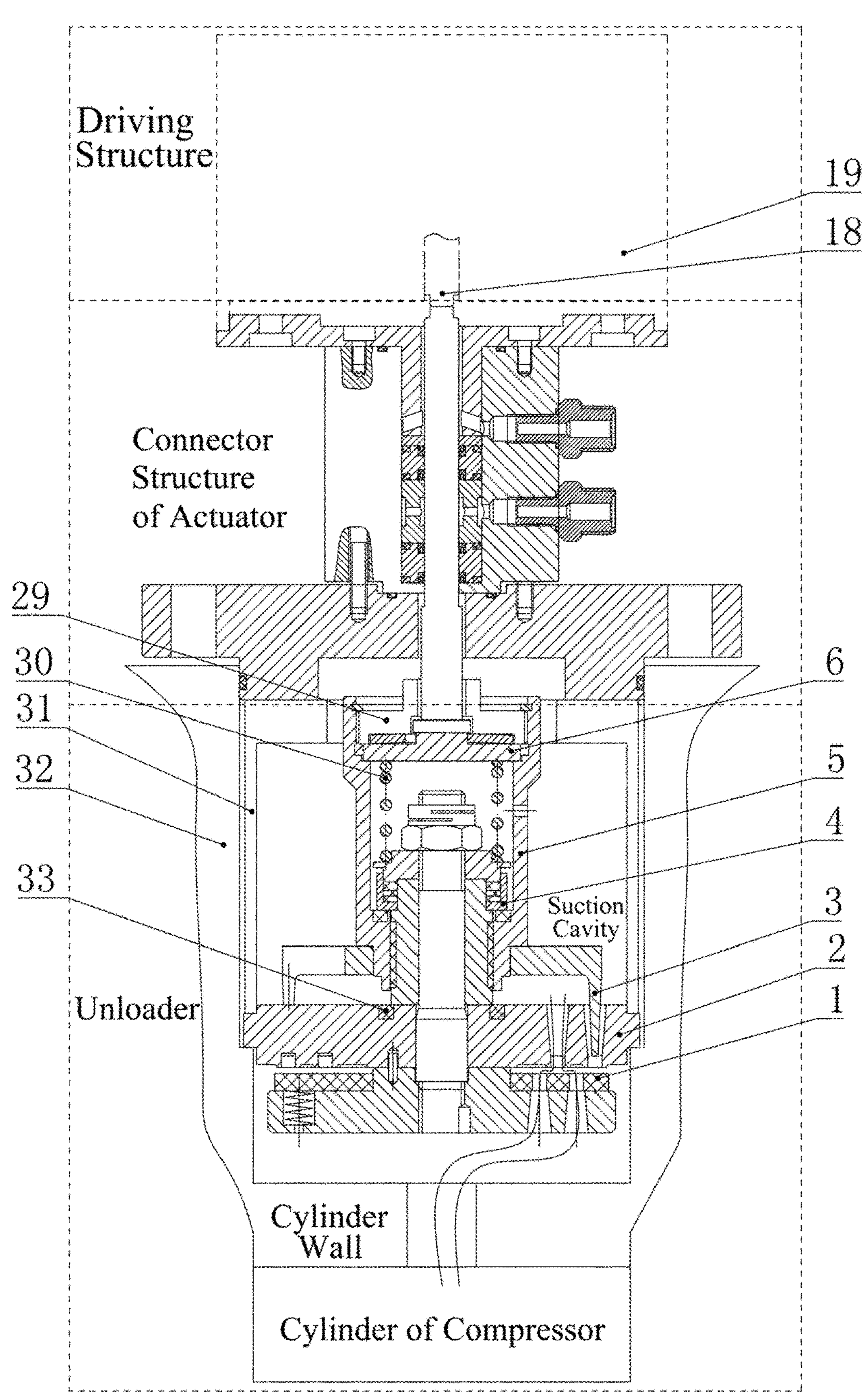
FIG. 2 is an assembly schematic diagram of the structure in FIG. 1 with a driving structure, an unloader, and a compressor.

In the drawings: 1 valve plate; 2 valve seat; 3 ejector fork; 4 buffer chamber; 5 shell; 6 ejector plate; 7 sealing ring of valve cover; 8 valve cover; 9 second end face sealing ring; 10 outer sealing ring B of second ring block; 11 gas leakage joint; 12 gas guide ring; 13 first ring block; 14 outer sealing ring A of first ring block; 15 oil leakage joint; 16 connecting member; 17 first end face sealing ring; 18 driving end; 19 driving structure; 20 ejector rod; 21 inner sealing ring A of first ring block; 22 inner sealing ring B of first ring block; 23 outer sealing ring B of first ring block; 24 housing; 25 outer sealing ring A of second ring block; 26 inner sealing ring A of second ring block; 27 second ring block; 28 inner sealing ring B of second ring block; 29 gland; 30 return spring; 31 housing of suction chamber; 32 cylinder wall of compressor; 33 noise reduction washer.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

The present disclosure aims to provide a connector structure of a stepless capacity control actuator of a reciprocating compressor to can solve the problems in the prior art, adapting to two driving modes of hydraulic pressure and electromagnetic force.

In order to make the objectives, features and advantages of the present disclosure more clearly, the present disclosure is further described in detail below with reference to the accompanying drawings and specific embodiments.

Referring to FIG. 1 to FIG. 4, this embodiment provides a connector structure of a stepless capacity control actuator of a reciprocating compressor (hereinafter referred to as connector), including an ejector rod 20, a housing 24, a connecting member 16, and a sealing assembly.

A first end of the ejector rod 20 is configured to connect with a ejector plate 6 of an unloader, and a second end of the ejector rod 20 is configured to connect with a driving end 18 of a driving structure 19. The housing 24 sleeves the ejector rod 20, and a gap is formed between the housing 24 and the ejector rod 20. A first oil hole is formed in the housing 24, and two ends of the first oil hole are located on an inner side surface and an outer side surface of the housing 24, respectively. A first end of the housing 24 is configured to connect with a valve cover 8 of a compressor. The connecting member 16 includes a flange part, and a sleeve part. A first side of the flange part is configured to connect with a second end of the housing 24, and a second side of the flange part is configured to connect with a shell of the driving structure 19, and be in scaling contact with the shell of the driving structure 19. The sleeve part is connected to one side, away from the driving structure 19, of the flange part, the sleeve part is located between the ejector rod 20 and the housing 24, and a gap is formed between the sleeve part and the ejector rod 20. A second oil hole is formed in the sleeve part, and two ends of the second oil are located on an inner side surface and an outer side surface of the sleeve part, respectively. The second oil hole is in butt joint the first oil hole. The sealing assembly includes a first end face scaling ring 17, a second end face sealing ring 9, a first seal ring, and an oil leakage joint 15. The first end face sealing ring 17 is configured to seal the gap between the first side of the flange part and the housing 24, and the second end face sealing ring 9 is configured to seal the gap between the valve cover 8 and the housing 24. The first seal ring is located between the ejector rod 20 and the housing 24, and located at one side, away from the driving structure 19, of the sleeve part. An inner side surface of the first seal ring is in sealing contact with the ejector rod 20, and an outer side surface of the first seal ring is in sealing contact with the inner side surface of the housing 24, thus sealing the gap between the ejector rod 20 and the housing 24. The oil leakage joint 15 is in communication with the first oil hole for recovering hydraulic oil in a case that the driving structure is a hydraulic cylinder.

The working principle of the connector is as follows:

During working, the driving structure 19 ejects and retracts the ejector rod 20 to transfer power to the unloader located in a suction chamber of the compressor through the ejector rod 20, thus controlling the action of a valve plate 1 of the unloader, and achieving the open and close of the suction chamber of the compressor.

The connecting member 16 is provided with the flange part configured to connect with the outer side of the driving structure 19 and the driving structure 19 here may be a hydraulic cylinder, or an electromagnetic driving structure, such that the connector can adapt to two driving modes of the hydraulic pressure and the electromagnetic force. A spigot structure can be arranged on a second side of the flange part to center the shell of the driving structure 19 with the flange part.

In a case that the driving structure 19 is the hydraulic cylinder, there may be a problem of leakage of hydraulic oil in the hydraulic cylinder. In order to solve the problem, in this embodiment, the second side of the flange part is in sealing contact with the shell of the driving structure 19 and the gap between the first side of the flange part and the housing 24 is sealed by the first end face sealing ring 17, thus guiding the leaked hydraulic oil to the second oil hole along the gap between the sleeve part and the ejector rod 20, so that the hydraulic oil reaches an oil leakage joint 15 through the first oil hole and the second oil hole, realizing the recovery of the hydraulic oil, and thus keeping clean and reducing the waste of the hydraulic oil.

The gas in the suction chamber may leak along the ejector rod 20, and the leakage of the gas is easy to cause danger as the pressure of the gas is high. As a possible example, in this embodiment, the sealing assembly further includes a gas guide ring 12 and a gas leakage joint 11. The gas guide ring 12 is located between the ejector rod 20 and the housing 24, and located at one side, away from the driving structure 19, of the first seal ring. A first gas hole is formed in the gas guide ring 12, and two ends of the first gas hole are located on an inner side surface and an outer side surface of the gas guide ring 12, respectively. A second gas hole is formed in the housing 24, and two ends of the second gas hole are located on the inner side surface and the outer side surface of the housing 24, respectively. The second gas hole is in butt joint the first gas hole. The gas leakage joint 11 is in communication with the second gas hole for recovering the gas leaked from the compressor.

As the gap between the valve cover 8 and the housing 24 is sealed by the second end face scaling ring 9, the gas leaked from the suction chamber flows to the gas guide ring 12 along the ejector rod 20, passes through the first gas hole and the second gas hole to reach the gas leakage joint 11, thus achieving the recovery of the leaked gas.

In order to reduce the volume of gas leaked from the suction chamber, as a possible example, in this embodiment, the sealing assembly further includes a second seal ring. The second seal ring is located between the ejector rod 20 and the housing 24, and located at one side, away from the driving structure 19, of the gas guide ring 12. An inner side surface of the second seal ring is in sealing contact with the ejector rod 20, and an outer side surface of the second seal ring is in sealing contact with the inner side surface of the housing 24, thus sealing the gap between the ejector rod 20 and the housing 24 to reducing the volume of gas leaked from the compressor to the gas guide ring 12.

The second seal ring can improve the sealing performance, such that the leaked gas needs greater gas pressure to reach the gas guide ring 12, thus the gas flow can be blocked to a certain extent to reduce the leakage of the gas.

An axial positioning reference of the first seal ring, the gas guide ring 12 and the second seal ring located between the ejector rod 20 and the housing 24 can be provided by the housing 24, or a positioning member fixed onto the housing 24. As a possible example, in this embodiment, the housing 24 is provided with an inner flange, the inner flange is located at one side, away from the driving structure 19, of the second seal ring for limiting a circumferential position of the second seal ring. The ejector rod 20 extends through the inner flange.

The inner flange is located at one side, away from the driving structure 19, of the second seal ring for limiting and the sleeve part is located at one side, close to the driving structure 19, of the first seal ring for limiting, thus clamping the first seal ring, the gas guide ring 12 and the second seal ring between the inner flange and the sleeve part.

There are many specific forms of the second seal ring, as long as the sealing purpose above can be achieved. As a possible example, in this embodiment, the second seal ring includes a second ring block 27, an inner sealing ring of the second ring block, and an outer scaling ring of the second ring block. The second ring block 27 is located between the ejector rod 20 and the housing 24. The inner sealing ring of the second ring block is embedded in an inner side surface of the second ring block 27 for making sealing contact with the ejector rod 20. The outer sealing ring of the second ring block is embedded in an outer side surface of the second ring block 27 for making sealing contact with the housing 24.

Exemplary, the inner sealing ring of the second ring block includes an inner sealing ring A 26 of the second ring block, and an inner seal ring B 28 of the second ring block, which are separated by a certain distance. Exemplary, the outer sealing ring of the second ring block includes an outer sealing ring A 25 of the second ring block, and an outer sealing ring B 10 of the second ring block, which are separated by a certain distance. The inner scaling ring A 26 of the second ring block and the outer sealing ring A 25 of the second ring block are located on one end, close to the driving structure 19, of the second ring block 27, the inner sealing ring B 28 of the second ring block and the outer sealing ring B 10 of the second ring block are located at one end, away from the driving structure 19, of the second ring block 27.

In order to improve the efficiency of guiding the leaked gas flow out, as a possible example, in this embodiment, an inner ring groove is formed in the inner side surface of the gas guide ring 12, and an outer ring groove is formed in the outer side surface of the gas guide ring 12. One end of the first gas hole is in communication with the inner ring groove, and the other end of the first gas hole is in communication with the outer ring groove. The gas leakage joint 11 can collect the gas in the whole circumferential direction through the outer ring groove.

Likely, the outer ring groove may be formed in a position where one end, located on the inner side surface of the housing 24, of the first oil hole is located, such that the leakage oil joint 15 can collect hydraulic oil in the whole circumferential direction at the same time.

There are many specific forms of the first seal ring, as long as the sealing purpose above can be achieved. As a possible example, in this embodiment, the first seal ring includes a first ring block 13, an inner sealing ring of the first ring block, and an outer sealing ring of the first ring block. The first ring block 13 is located between the ejector rod 20 and the housing 24, the inner sealing ring of the first ring block is embedded in the inner side surface of the first ring block 13 for making sealing contact with the ejector rod 20. The outer sealing ring of the first ring block is embedded in an outer side surface of the first ring block 13 for making sealing contact with the housing 24.

Exemplary, the inner sealing ring of the first ring block includes an inner sealing ring A 21 of the first ring block, and an inner seal ring B 22 of the first ring block, which are separated by a certain distance. The outer sealing ring of the first ring block includes an outer sealing ring A 14 of the first ring block, and an outer sealing ring B 23 of the first ring block, which are separated by a certain distance. The inner sealing ring A 21 of the first ring block and the outer sealing ring A 14 of the first ring block are located on one end, close to the driving structure 19, of the first ring block 13, the inner sealing ring B 22 of the first ring block and the outer sealing ring B 23 of the first ring block are located at one end, away from the driving structure 19, of the first ring block 13.

Exemplary, a lip of each of the inner sealing ring A 26 of the second ring block and the inner seal ring B 28 of the second ring block faces towards the valve cover 8 to prevent the gas in the suction chamber from leaking. A lip of the inner sealing ring A 21 of the first ring block faces towards the driving structure 19 to prevent the hydraulic oil from continuing to flow to the gas guide ring 12. A lip of the inner sealing ring B 22 of the first ring block faces towards the gas guide ring 12 to prevent the gas from continuing to flow to the sleeve part. By means of the design of the lip orientation above, the gas leakage joint 11 and the oil leakage joint 15 can collect the leaked gas and leaked hydraulic oil, respectively. Moreover, the sealing effect can be improved by arranging multiple sealing rings in series in an axial direction of the ejector rod 20. A groove in which each sealing ring is embedded is preferably an open groove to facilitate mounting and dismounting.

In order to make the hydraulic oil flow to the oil leakage joint 15 more smoothly, as a possible example, in this embodiment, the second oil hole is arranged obliquely with respect to the sleeve part. One end, located on the inner side surface of the sleeve part, of the second oil hole is closer to the driving structure 19 than one end, located on the outer side surface of the sleeve part, of the second oil hole.

During use, as the driving structure 19 is located above the ejector rod 20, the hydraulic oil, when flowing downwards under gravity, can flow outwards along the obliquely arranged second oil hole, thus facilitating the oil leakage joint 15 to collect the hydraulic oil.

Exemplary, the structure of the unloader may refer to the description of the Chinese Patent Publication No. CN110206712A, one end, away from the driving structure 19, of the ejector rod 20 are clamped between the ejector plate 6 and the gland 29. The ejector plate 6 and the gland 29 are both fixedly connected to the shell 5, the shell 5 is fixedly connected to the ejector fork 3, such that the ejector fork 3 and the ejector rod 20 can move synchronously.

In the ejection stroke of the ejector rod 20, the ejector rod 20 is pushed to move by an ejection driving force F (hydraulic pressure or electromagnetic force) provided by the driving structure 19, and the ejector rod 20 moves against the friction force, and the ejector plate 6 moves against the thrust of the return spring 30. When a prong of the ejector fork 3 is in contact with the valve plate 1, the ejector fork 3 moves against the thrust of a suction valve spring and a gas pressure difference between both sides of the valve plate 1, and then the valve plate 1 is opened, making the gas in the compressor flow into the suction chamber. The shell 5 no longer moves after making contact with a noise reduction washer 33 on the valve seat 2, and the stroke of the ejector fork 3 is L. When the gas volume returned from the compressor to the suction chamber meets the requirements of process control, the retraction stroke of the ejector rod 20 is started.

In the retraction stroke of the ejector rod 20, the ejector fork 3 moves under the action of the pressure difference between both sides of the valve plate 1 and the suction valve spring, the ejector plate 6 moves under the action of the return spring 30, and the ejector rod 20 moves against the friction under the action of a retraction driving force F' provided by the driving structure 19. After the ejector fork 3 is separated from the valve plate 1, the valve plate 1 is reset under the action of the suction valve spring and a gas force, so that the suction chamber is closed, and the compressor starts normal compression, exhaust, expansion and other working processes. The ejector plate 6 moves under the action of the return spring 30, and the ejector rod 20 moves against the friction force under the action of the driving force provided by the driving structure 19.

It should be noted that in order to reduce the impact force in the retraction process of the ejector rod 20, the driving force of the driving structure 19 on the ejector rod 20 cannot be zero, the greater the pressure difference between both sides of the valve plate 1, the greater the driving force of the driving structure 19 on the ejector rod 20 in the retraction stroke. In this embodiment, the retraction driving force ranges from 200 N to 800 N.

As a possible example, in this embodiment, a computing process related to the model selection is further provided, thus facilitating the model selection of the parts.

In the following, the computation process will be described in detail, including the computation of the ejection driving force F, the retraction driving force F', the stiffness k of the return spring 30, and a diameter d of the ejector rod 20.

(1) Design Parameter $$A=\{p_{cy}, p_0, p_s, \beta, A_{sv}, A_l, f, g, L, \alpha, m, x_1, F_{g2}\}$$

where

- $p_{cy}$ is a gas pressure in the compressor, there is a surface pressure difference between both sides of the valve plate 1 duo to gas resistance and other reasons during the backflow of the compressor, and the pressure difference acting on the valve plate 1 is about 0.001 MPa which is calculated through computer simulation;
- $p_0$ is a standard atmospheric pressure;
- $p_s$ is a gas pressure in a suction chamber of the compressor;
- $\beta$ is a coefficient of the pressure difference between both sides of the valve plate 1 of the unloader;
- $A_{sv}$ is the area of the valve plate 1 (both sides have the same area);
- $A_1$ is the sectional area of the ejector rod 20, $$A_l=\frac{\pi}{4}d_1^2;$$

$d_1$ is a diameter or a section, close to the driving structure 19, of the ejector rod 20, and a diameter $d_2$ of a section, away from the driving structure 19, of the ejector rod 20 is equal to $1.5d_1$;
- f is the friction force subjected by the ejector rod 20;
- g is gravity acceleration; L is a stroke of the unloader;
- $\alpha$ is a mounting angle of the unloader, which indicates an included angle between a central line of the unloader and a line perpendicular to the ground;

m is the sum of the masses of the ejector rod 20, the shell 5 of the unloader, the ejector plate 6 of the unloader, the ejector fork 3 of the unloader and the gland 29 of the unloader;

$x_1$ is a pre-compression amount of the return spring 30; and $F_{g2}$ is a gas force subjected by the valve plate 1, $F_{g2}=\beta(p_{cy}-p_s)A_{sv}$.

(2) Retraction Driving Force F'

In order to reduce the impact force of the actuator in the retraction process, the retraction driving force F' should not be zero, the higher the suction pressure, the greater the value of the retraction driving force F'. The value of the retraction driving force F' ranges from 200 N to 800 N to reduce the impact force in the retraction process.

(3) Stiffness k of Return Spring 30

The differential equation of movement in the retraction process is as follows:

$$m\ddot{x} = F' - F_{g1} + mg\cos\alpha - f - kx - F_{g2} \tag{1}$$

where $\ddot{x}$ is ejection acceleration of the unloader;

F' is a driving force in the retraction process of the unloader (the hydraulic pressure or electromagnetic force provided by the driving structure 19);

$F_{g1}$ is a pressure force of the gas chamber, $F_{g1}=(p_s-p_0)A_1$;

k is the stiffness of the return spring 30 of the unloader;

x is the compression amount of the return spring 30 of the unloader.

An initial condition of the formula (1) is as follows:

$$\begin{cases} \dot{x}(0) = 0; \\ x(0) = x_1 + L; \end{cases} \tag{2}$$

where $\dot{x}$ is an ejection speed of the unloader;

x(0) is an initial displacement of the unloader in the ejection process.

A displacement equation in the retraction process can be obtained from formula (1) and formula (2):

$$x(t) = \left(x_1 + L - \frac{F' - F_{g1} - F_{g2} - f + mg\cos\alpha}{k}\right)\cos\left(\sqrt{\frac{k}{m}}\cdot t\right) + \frac{F' - F_{g1} - F_{g2} - f + mg\cos\alpha}{k} \tag{3}$$

where t is the movement time of the retraction process of the unloader.

A boundary condition of formula (3) is as follows:

$$\text{when } t = t'_{max},\ x = x_1 \tag{4}$$

where:

$t'_{max}$ should ranges from 0.008 s to 0.02 s by considering the control effect of a capacity control system.

The stiffness of the spring can be obtained through formula (3) and formula $$k = m\frac{\arccos\left(\frac{F_{s1} - F' + F_{g1} + F_{g2} + f - mg\cos\alpha}{F_{s2} - F' + F_{g1} + F_{g2} + f - mg\cos\alpha}\right)}{t'_{max}} \tag{5}$$

where $F_{si}$: i is 1 or 2, where $F_{s1}$ is the pre-compression force of the return spring 30 of the unloader, $F_{s2}$ is the maximum spring force of the return spring 30 when the unloader moves to a lower stop point.

By considering that the unloader can retract to an upper limit position in the retraction process, the stiffness of the spring needs to meet the following conditions:

$$k > \frac{F' + mg\cos\alpha - f - F_{g1}}{x_1} \tag{6}$$

(4) Ejection Driving Force F

The differential equation of movement in the ejection process is as follows:

$$m\ddot{x} = F - F_{g1} + mg\cos\alpha - f - kx \tag{7}$$

where

F is a driving force in the ejection process of the unloader (the hydraulic pressure or electromagnetic force provided by the driving structure 19).

An initial condition of the formula (7) is as follows:

$$\begin{cases} \dot{x}(0) = 0; \\ x(0) = x_1; \end{cases} \tag{8}$$

A displacement equation in the ejection process can be obtained from formula (7) and formula (8);

$$x(t) = \left(x_1 - \frac{F - F_{g1} - f + mg\cos\alpha}{k}\right)\cos\left(\sqrt{\frac{k}{m}}\cdot t\right) + \frac{F - F_{g1} - f + mg\cos\alpha}{k} \tag{9}$$

A boundary condition of formula (9) is as follows:

$$\text{when } t = t_{max},\ x = x_1 + L \tag{10}$$

where $t_{max}$ should ranges from 0.008 s to 0.02 s by considering the control effect of a capacity control system.

The ejection driving force can be obtained through formula (9) and formula (10):

$$F = \frac{k\left(x_1 + L - x_1\cdot\cos\left(\sqrt{\frac{k}{m}}\cdot t_{max}\right)\right)}{1 - \cos\left(\sqrt{\frac{k}{m}}\cdot t_{max}\right)} + F_{g1} + f - mg\cos\alpha \tag{11}$$

(5) Diameter of the Ejector Rod 20 i: the diameter should not be less than 10 mm by considering that the ejector rod 20 is subjected to high-frequency and high-strength impact load;

ii: in order to increase the strength of the ejector rod 20, a variable diameter structure design is adopted, where the diameter $d_1$ of a section, being in contact with the sealing assembly, of the ejector rod 20 is identical to an inner diameter of the sealing assembly and needs to be selected with reference to the standard specifications of the conventional sealing ring, and a diameter $d_2$ of the section, being contact with the non-sealing assembly, of the ejector rod 20 is equal to 1.5 $d_1$; and iii: the diameter $d_1$ of the ejector rod 20 needs to adopt an iterative computation method:

Initially, $d_1$=10 mm is substituted into formula (11) to calculate the ejection driving force;

If F≤800 N, then $d_1$=10 mm, and the diameter of the ejector rod 20 is determined.

If F>800 N, the diameter $d_1$ of the ejector rod 20 needs to be increased to 12 mm; and $d_1$=12 mm is substituted into formula (11) for iterative computation, thus calculating the ejection driving force.

If 800 N≤F≤1600 N, $d_1$=12 mm, and the diameter of the ejector rod 20 is determined.

If F>1600 N, the diameter $d_1$ of the ejector rod 20 needs to be increased to 14 mm, the stiffness of the ejector rod 20 is sufficient for use, the iterative computation is ended, and the diameter of the ejector rod 20 is determined.

Figure 3:
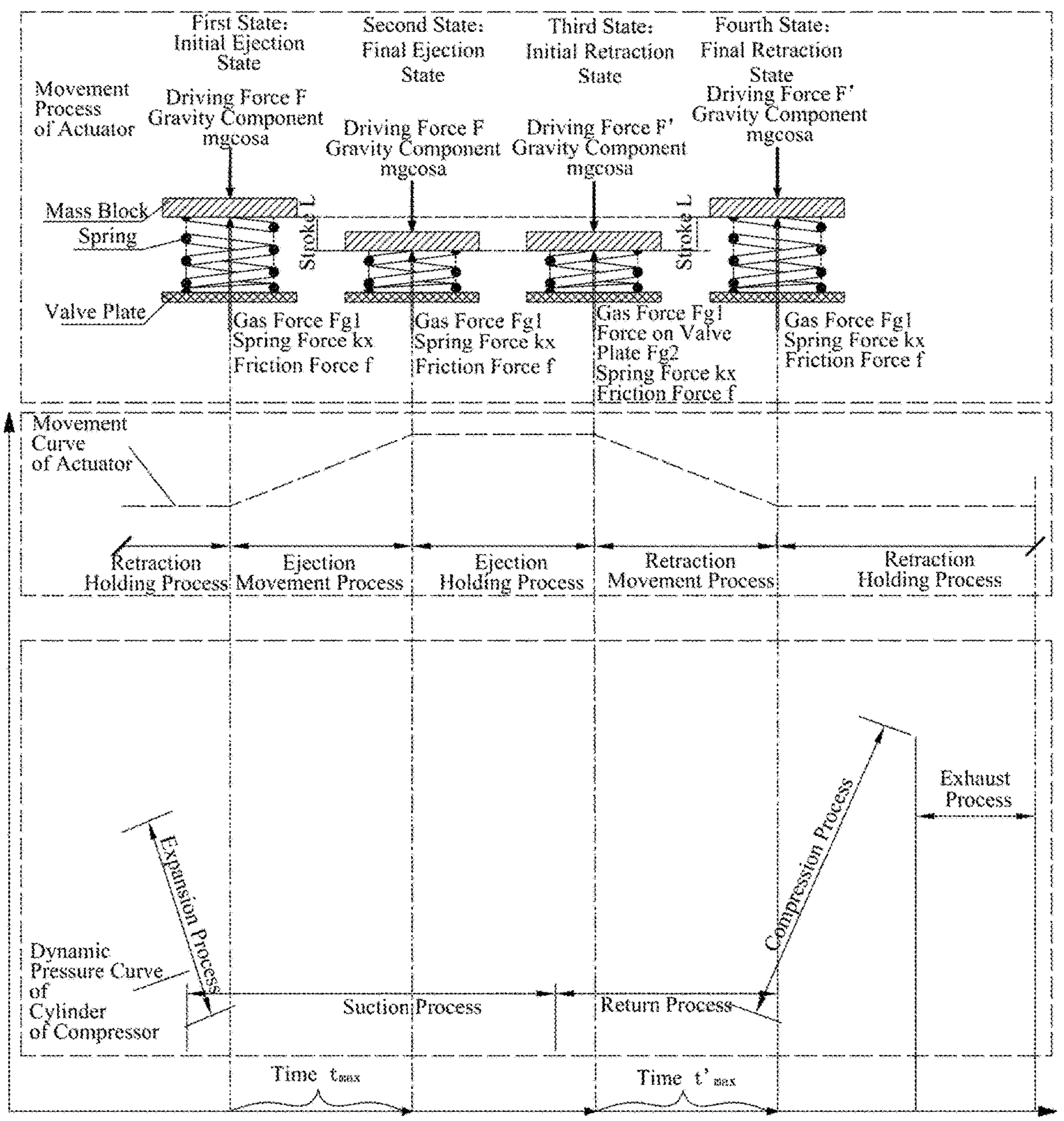
FIG. 3 is a schematic diagram of stress analysis of a connector structure of a stepless capacity control actuator of a reciprocating compressor according to an embodiment of the present disclosure.
Figure 4:
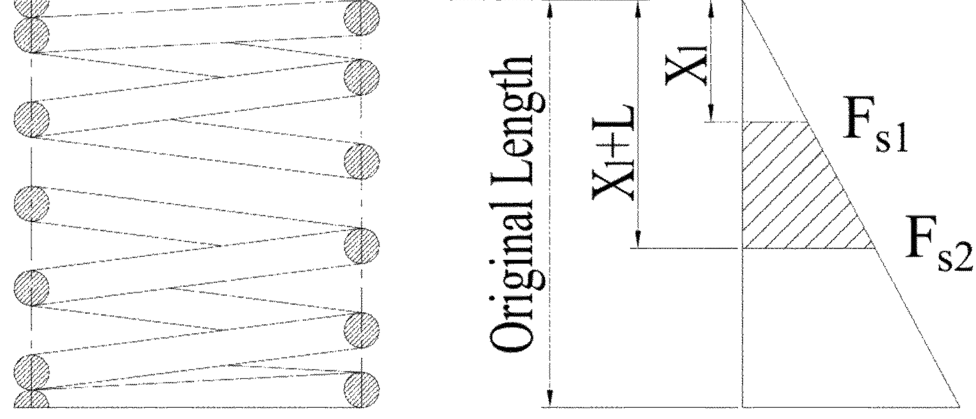
FIG. 4 is a schematic diagram of the relationship between compression amount and corresponding spring force of a return spring in different working conditions.

In order to explain the stress situation more clearly, the stress situation in the whole movement process will be analyzed with reference to FIG. 3 and FIG. 4.

Referring to FIG. 3, all movement components of the actuator are simplified as mass blocks (the mass is m). The force subjected by the actuator includes: gravity mg cos α, ejection driving force F, retraction driving force F', spring force kx of the return spring 30, force $F_{g2}$ of the valve plate 1, force $F_{g1}$ of gas pressure in the gas chamber on the ejector rod 20, and friction force f.

The working states of the actuator are divided into four types of working states. The first working state is an initial ejection state, the actuator is located at the upper limit position, the compression amount of the return spring 30 is $x_1$, the ejection process occurs in the suction process of the reciprocating compressor. As the valve plate 1 of the suction valve is automatically opened in the suction process, the actuator will not be forced by the valve plate 1 in the ejection process, thus the force subjected by the actuator includes F, mg cos α, $kx_1$, f, and $F_{g1}$.

The second working state is a final ejection state. The actuator moves downward to the lower limit position under the action of the ejection driving force, and the compression of the return spring 30 at this time is $x_1$+L, and the actuator will remain stationary under the action of the ejection driving force, thus the force subjected by the actuator includes F, mg cos α, k ($x_1$+L), f, and $F_{g1}$.

The third working state is an initial retraction state. When the returned capacity meets the requirements of process control, the driving force is switched to the retraction driving force F', and the movement component moves upwards along the guide assembly against the retraction driving force F' and the friction force under the action of the return spring 30 and gas force. The compression amount of the return spring 30 at this time is $x_1$+L, and the initial retraction state is in the process of compression. The valve plate 1 of the suction valve is automatically closed and is in contact with the ejector fork 3, and the valve plate 1 will exert an upward force on the ejector fork 3, thus the force subjected by the actuator includes F, mg cos α, $kx_1$, f, $F_{g1}$, and $F_{g2}$.

The fourth working state is a final retraction state. Under the push of the return spring 30, the gas force, and the force of the valve plate 1, the actuator moves to the upper limit position. The compression amount of the return spring 30 at this time is $x_1$, and the ejector fork 3 is separated from the valve plate 1, and the actuator will not be forced by the valve plate 1, thus the force subjected by the actuator includes F, mg cos α, $kx_1$, f, and $F_{g1}$. From the first working state to the second working state, the required time is $t_{max}$, and from the third working state to the fourth working state, the required time is $t'_{max}$.

Referring to FIG. 4, in the initial ejection state and the final retraction state, the compression amount of the return spring 30 is $x_1$, the spring force of the return spring 30 is $F_{s1}$. In the final ejection state and the initial retraction state, the compression amount of the return spring 30 is $x^1$+L, the spring force of the return spring 30 is $F_{s2}$.

Referring to the computation method above, the computation involved in the model selection of the components will be exemplary illustrated in this embodiment by combining the relevant parameters of two specific compressors. During actual application, it is not limited to the compressor example below. The computation process mainly including:

(1) The design parameters are specified, as shown in Table 1, including the design parameters of two different compressors:

TABLE 1

The size of energy-saving control system

| System parameter and correlation | Symbol | Compressor 1 | Compressor 2 |
|---|---|---|---|
| Standard atmospheric pressure | $p_0$ | 0.1 MPa | 0.1 MPa |
| Inlet pressure (absolute pressure) | $p_s$ | 0.1 MPa | 4 MPa |
| Exhaust pressure | $p_d$ | 0.3 MPa | 9 Mpa |
| Movement components of unloader | m | 2 kg | 3 kg |
| Pressure difference coefficient | β | 0.85 | 0.85 |
| Stroke of unloader | L | 0.003 m | 0.003 m |
| Mounting angle of unloader | α | 30° | 30° |
| Gravity acceleration | g | 9.8 kg/m$^3$ | 9.8 kg/m$^3$ |
| Total friction of movement components | f | 40N | 40N |
| Initial diameter of ejector rod | $d_1$ | 0.01 m | 0.01 m |
| Surface area of valve plate | $A_{sv}$ | 0.0043 m$^2$ | 0.018 m$^2$ |
| Pre-compression amount of spring | $x_1$ | 0.0045 m | 0.0045 m |

(2) According to the data in step (1), the driving force, the spring force of the return spring 30 and the diameter of the ejector rod 20 are obtained by combining the design and computation method of key parameters of the actuator;

1. Gas Force

Compressor 1:

$$\begin{cases} F_{g2} = \beta(p_{cy} - p_s)A_{sv} = 0.85 \times 0.001 \times 10^6 \times 0.0043 = 3.66\text{N} \\ F_{g1} = (p_s - p_0)A_l = (0.1 - 0.1) \times 10^6 \times \frac{\pi}{4} \times 10^2 \times 10^{-6} = 0 \end{cases}$$

Compressor 2:

$$\begin{cases} F_{g2} = \beta(p_{cy} - p_s)A_{sv} = 0.85 \times 0.001 \times 10^6 \times 0.018 = 15.3\text{N} \\ F_{g1} = (p_s - p_0)A_l = \left(4 - 0.1 \times 10^6 \times \frac{\pi}{4} \times 10^2 \times 10^{-6}\right) = 306.15\text{N} \end{cases}$$

2. When the reciprocating compressor 1 has low inlet pressure, and the retraction driving force is 200 N. When the reciprocating compressor 2 has high inlet pressure, and the retraction driving force is 500 N.

3. Stiffness of the Return Spring 30

Each of $t'_{max}$ and $t_{max}$ is 0.008 s, then

Compressor 1:

$$k = 2 \times \frac{\arccos\left(\frac{0.0045k - 200 + 3.66 + 0 + 40 - 2 \times 9.8 \times \cos 30'}{0.0075k - 200 + 3.66 + 0 + 40 - 2 \times 9.8 \times \cos 30'}\right)}{0.012}$$

k obtained is equal to 51874.75 N/m. then

Compressor 2:

$$k = 3 \times \frac{\arccos\left(\frac{0.0045k - 500 + 15.3 + 306.15 + 40 - 3 \times 9.8 \times \cos 30'}{0.0075k - 500 + 15.3 + 306.15 + 40 - 3 \times 9.8 \times \cos 30'}\right)}{0.012}$$

k obtained is equal to 76137.98 N/m.

Considering that the unloader can retract to the upper limit position in the retraction process, the stiffness of the spring needs to meet the following conditions:

Compressor 1:

$$k > \frac{F' + mg\cos\alpha - f - F_{g1}}{x_1} = \frac{200 + 16.98 - 40 - 0}{0.0045} = 39328.16\text{N/m}$$

Compressor 2:

$$k > \frac{F' + mg\cos\alpha - f - F_{g1}}{x_1} = \frac{500 + 16.98 - 40 - 440.86}{0.0045} = 37961.49\text{N/m}$$

The stiffness of the return spring 30 in working conditions 1 and 2 both meets the requirements.

4. Ejection Driving Force

Compressor 1:

$$F = \frac{k\left(x_1 + L - x_1 \cdot \cos\left(\sqrt{\frac{k}{m}} \cdot t_{max}\right)\right)}{1 - \cos\left(\sqrt{\frac{k}{m}} \cdot t_{max}\right)} + F_{g1} + f - mg\cos\alpha$$

$$= \frac{51874.76 \times \left(0.0045 + 0.003 - 0.0045 \times \cos\left(\sqrt{\frac{51874.76}{2}} \times 0.008\right)\right)}{1 - \cos\left(\sqrt{\frac{51874.76}{2}} \times 0.008\right)} + 0 + 40 - 2 \times 9.8 \times \cos 30$$

$$= 472.2\text{N}$$

Compressor 2:

$$F = \frac{k\left(x_1 + L - x_1 \cdot \cos\left(\sqrt{\frac{k}{m}} \cdot t_{max}\right)\right)}{1 - \cos\left(\sqrt{\frac{k}{m}} \cdot t_{max}\right)} + F_{g1} + f - mg\cos\alpha$$

$$= \frac{76137.98 \times \left(0.0045 + 0.003 - 0.0045 \times \cos\left(\sqrt{\frac{76137.98}{3}} \times 0.008\right)\right)}{1 - \cos\left(\sqrt{\frac{76137.98}{3}} \times 0.008\right)} + 306.15 + 40 - 2 \times 9.8 \times \cos 30$$

$$= 994.42\text{N}$$

In the ejection holding process, the ejection driving force needs to be greater than the resultant force of the gas force, the gravity and the maximum displacement spring force as it is necessary to keep the actuator in ejection state, constraint conditions of the ejection driving force are as follows:

$$F \geq Fg1 - mg\cos\alpha + f + k(x1 + L) = 412.08\text{N} \quad \text{Compressor 1}$$

$$F \geq Fg1 - mg\cos\alpha + f + k(x1 + L) = 900.21\text{N} \quad \text{Compressor 2}$$

The ejection driving forces of the compressor 1 and the compressor 2 both meet the requirements.

5. Diameter of the Ejector Rod 20

In "4. Ejection driving force", the ejection driving force of the compressor 1 is less than 800 N, then $d_1$=10 mm, $d_2$=1.5$d_1$=15 mm.

The ejection driving force of the compressor 2 is greater than 800 N, the diameter of the ejector rod 2 needs to be increased, $d_1$=12 mm is substituted into the formula for iterative computation to calculate the ejection driving force:

$$F = \frac{k\left(x_1 + L - x_1 \cdot \cos\left(\sqrt{\frac{k}{m}} \cdot t_{max}\right)\right)}{1 - \cos\left(\sqrt{\frac{k}{m}} \cdot t_{max}\right)} + F_{g1} + f - mg\cos\alpha$$

-continued $$= \frac{76137.98\times\left(0.0045+0.003-0.0045\times\cos\left(\sqrt{\frac{76137.98}{3}}\times0.008\right)\right)}{1-\cos\left(\sqrt{\frac{76137.98}{3}}\times0.008\right)} + 440.856+40-2\times9.8\times\cos 30$$

$$= 1129.12\text{N}$$

If 800 N≤F≤1600 N, $d_1$=12 mm, and the diameter of the ejector rod 20 in the working condition 2 is determined.

Specific examples are used herein for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A connector structure of a stepless capacity control actuator for a reciprocating compressor, comprising:

an ejector rod having a first end configured to connect with an ejector plate of an unloader, and a second end configured to connect with a driving end of a driving structure comprised in the stepless capacity control actuator;

a housing sleeving the ejector rod, wherein a gap is formed between the housing and the ejector rod, a first oil hole is formed in the housing, two ends of the first oil hole are located on an inner side surface and an outer side surface of the housing, respectively, and a first end of the housing is configured to connect with a valve cover comprised in the reciprocating compressor;

a connecting member comprising a flange part and a sleeve part, the flange part having a first side configured to connect with a second end of the housing, and a second side configured to connect with a shell of the driving structure and be in sealing contact with the shell, the sleeve part being located between the ejector rod and the housing and being connected to one side, away from the driving structure, of the flange part, wherein a gap is formed between the sleeve part and the ejector rod, a second oil hole is formed in the sleeve part, two ends of the second oil hole are located on an inner side surface and an outer side surface of the sleeve part, respectively, and the second oil hole is in butt joint with the first oil hole; and a sealing assembly comprising: a first end face sealing ring configured to seal a gap between the first side of the flange part and the housing, a second end face sealing ring configured to seal a gap between the valve cover and the housing, a first seal ring located between the ejector rod and the housing, and located on one side, away from the driving structure, of the sleeve part and an oil leakage joint in communication with the first oil hole, wherein an inner side surface of the first seal ring is in sealing contact with the ejector rod, and an outer side surface of the first seal ring is in sealing contact with the inner side surface of the housing to seal the gap between the ejector rod and the housing.

2. The connector structure of a stepless capacity control actuator for a reciprocating compressor according to claim 1, wherein the sealing assembly further comprises:

a gas guide ring located between the ejector rod and the housing, and located at one side, away from the driving structure, of the first seal ring and having a first gas hole formed in the gas guide ring, two ends of the first gas hole being located on an inner side surface and an outer side surface of the gas guide ring, respectively, wherein a second gas hole is formed in the housing and two ends of the second gas hole are located on the inner side surface and the outer side surface of the housing, respectively; the second gas hole is in butt joint with the first gas hole; and a gas leakage joint in communication with the second gas hole for recovering gas leaked from the reciprocating compressor.

3. The connector structure of a stepless capacity control actuator for a reciprocating compressor according to claim 2, wherein the sealing assembly further comprises a second seal ring located between the ejector rod and the housing, and located at one side, away from the driving structure, of the gas guide ring, an inner side surface of the second seal ring is in scaling contact with the ejector rod, and an outer side surface of the sealing ring is in sealing contact with the inner side surface of the housing, such that the gap between the ejector rod and the housing is sealed to reduce an volume of gas leaked from the reciprocating compressor to the gas guide ring.

4. The connector structure of a stepless capacity control actuator for a reciprocating compressor according to claim 3, wherein the housing is provided with an inner flange located at one side, away from the driving structure, of the second seal ring for limiting a circumferential position of the second seal ring, and the ejector rod extends through the inner flange.

5. The connector structure of a stepless capacity control actuator for a reciprocating compressor according to claim 3, wherein the second seal ring comprises:

a second ring block located between the ejector rod and the housing, an inner sealing ring of the second ring block embedded in an inner side surface of the second ring block for making sealing contact with the ejector rod, and an outer scaling ring of the second ring block embedded in an outer side surface for the second ring block for making scaling contact with the inner side surface of the housing.

6. The connector structure of a stepless capacity control actuator for a reciprocating compressor according to claim 2, further comprising: an inner ring groove formed in the inner side surface of the gas guide ring, and an outer ring groove formed in the outer side surface of the gas guide ring, wherein one end of the first gas hole is in communication with the inner ring groove; and an other end of the first gas hole is in communication with the outer ring groove.

7. The connector structure of a stepless capacity control actuator for a reciprocating compressor according to claim 1, wherein the first seal ring comprises;

a first ring block located between the ejector rod and the housing, an inner scaling ring of the first ring block embedded in an inner side surface of the first ring block for making sealing contact with the ejector rod, and an outer sealing ring of the first ring block embedded in an outer side surface of the first ring block for making sealing contact with the inner side surface of the housing.

8. The connector structure of a stepless capacity control actuator for a reciprocating compressor according to claim 1, wherein the second oil bole is obliquely arranged with respect to the sleeve part; and one end, located on the inner side surface of the sleeve part, of the second oil hole is closer to the driving structure than one end, located on the outer side surface of the sleeve part, of the second oil hole.

9. The connector structure of a stepless capacity control actuator for a reciprocating compressor according to claim 1, wherein:

following requirements need to be met during model selection of a return spring of the unloader:

$$k = m\frac{\arccos\left(\frac{F_{s1} - F' + F_{g1} + F_{g2} + f - mg\cos\alpha}{F_{s2} - F' + F_{g1} + F_{g2} + f - mg\cos\alpha}\right)}{t'_{max}}$$

$$k > \frac{F' + mg\cos\alpha - f - F_{g1}}{x_1}$$

following requirements need to be met during model selection of the driving structure:

$$F = \frac{k\left(x_1 + L - x_1\cdot\cos\left(\sqrt{\frac{k}{m}}\cdot t_{max}\right)\right)}{1-\cos\left(\sqrt{\frac{k}{m}}\cdot t_{max}\right)} + F_{g1} + f - mg\cos\alpha$$

wherein $p_{cy}$ is a gas pressure in the compressor; $p_0$ is a standard atmospheric pressure; $p_s$ is a gas pressure in a suction chamber of the compressor; β is a coefficient of a pressure difference between both sides of a valve plate of the unloader; $A_{sv}$ is an area of the valve plate; $A_1$ is a sectional area of the ejector rod, $$A_l = \frac{\pi}{4}d_1^2;$$

$d_1$ is a diameter of a section, close to the driving structure, of the ejector rod, and a diameter $d_2$ of a section, away from the driving structure, of the ejector rod is equal to $1.5d_1$; f is a friction force subjected by the ejector rod; g is gravity acceleration; L is a stroke of the unloader; α is a mounting angle of the unloader, which indicates an included angle between a central line of the unloader and a line perpendicular to a ground; m is a sum of masses of the ejector rod, the shell of the unloader, the ejector plate of the unloader, a ejector fork of the unloader and a gland of the unloader; $x_1$ is a pre-compression amount of the return spring; $F_{g2}$ is a gas force subjected by the valve plate, $F_{g2}=\beta(p_{cy}-p_s)A_{sv}$; k is stiffness of the return spring; x is a compression amount of the return spring; F' is a driving force of the driving structure on the ejector rod in a retraction process of the ejector rod; and F is a driving force of the driving structure on the ejector rod in an ejection process of the ejector rod.

10. The connector structure of a stepless capacity control actuator for a reciprocating compressor according to claim 9, wherein during model selection of the ejector rod, the diameter of the ejector rod is determined through following iterative computation modes:

initially, $d_1$=10 mm is substituted into formula $$F = \frac{k\left(x_1 + L - x_1\cdot\cos\left(\sqrt{\frac{k}{m}}\cdot t_{mx}\right)\right)}{1-\cos\left(\sqrt{\frac{k}{m}}\cdot t_{mx}\right)} + F_{g1} + f - mg\cos\alpha$$

to calculate an ejection driving force;

if F≤800 N, then $d_1$=10 mm, and the diameter of the ejector rod is determined;

if F>800 N, then the diameter $d_1$ of the ejector rod needs to be increased to 12 mm;

$d_1$=12 mm is substituted into formula (11) for iterative computation to calculate an ejection driving force F;

if 800 N≤F≤1600 N, then $d_1$=12 mm, and the diameter of the ejector rod is determined; and if F>1600 N, then the diameter $d_1$ of the ejector rod needs to be increased to 14 mm, so that strength of the ejector rod is sufficient for use, the iterative computation is ended, and the diameter of the ejector rod is determined.

* * * * *